G. P. GIBSON.
ORE ROASTING FURNACE.
APPLICATION FILED JUNE 27, 1913.

1,107,604.

Patented Aug. 18, 1914.
3 SHEETS—SHEET 1.

Witnesses
Harry B. Rook
[signature]

Inventor
GEORGE P. GIBSON
By [signature]
his Attorney

G. P. GIBSON.
ORE ROASTING FURNACE.
APPLICATION FILED JUNE 27, 1913.

1,107,604.

Patented Aug. 18, 1914.

3 SHEETS—SHEET 2.

Witnesses
Harry B. Rook
Clay C. Snivall

Inventor
GEORGE P. GIBSON

By
his Attorney

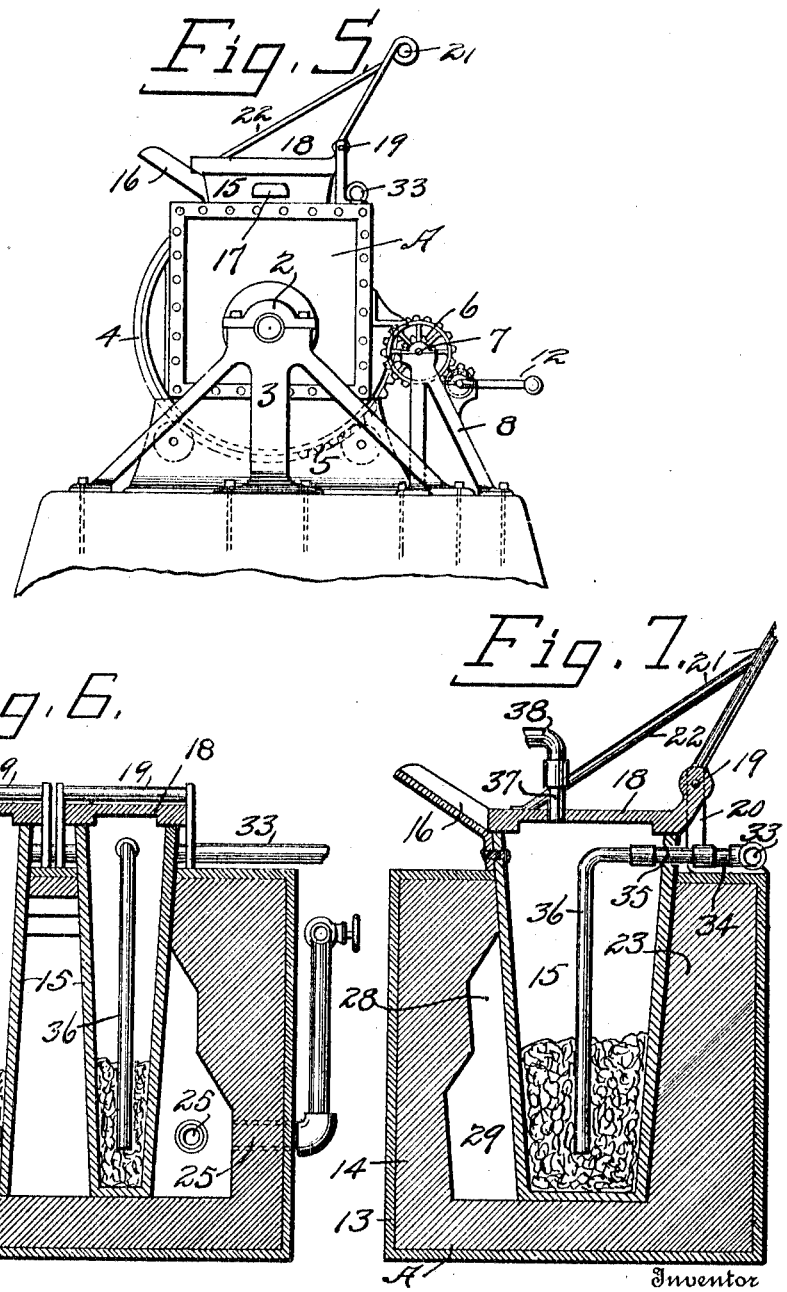

UNITED STATES PATENT OFFICE.

GEORGE P. GIBSON, OF BRADDOCK, PENNSYLVANIA.

ORE-ROASTING FURNACE.

1,107,604. Specification of Letters Patent. Patented Aug. 18, 1914.

Application filed June 27, 1913. Serial No. 776,133.

*To all whom it may concern:*

Be it known that I, GEORGE P. GIBSON, a citizen of the United States, residing at Braddock, in the county of Allegheny and State of Pennsylvania, have invented certain new and useful Improvements in Ore-Roasting Furnaces, of which the following is a specification.

The present invention relates to an improved furnace for removing sulfur, phosphorus and other impurities from any kind of raw ore by a gentle roasting action without loss of the metal values, thus putting the ore in the necessary and desired condition for subsequent treatment.

The furnace is more particularly designed for the treatment of iron ores which are adapted to be immediately converted into the commercial grades of iron or steel after the sulfur, phosphorus, or like impurities have been removed therefrom.

The object of the invention is to provide a furnace of this character which can be quickly charged and discharged, which will apply the heat to the ore in the most effective manner for removing the sulfur and other impurities therefrom, and which is durable and inexpensive in its construction.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1:
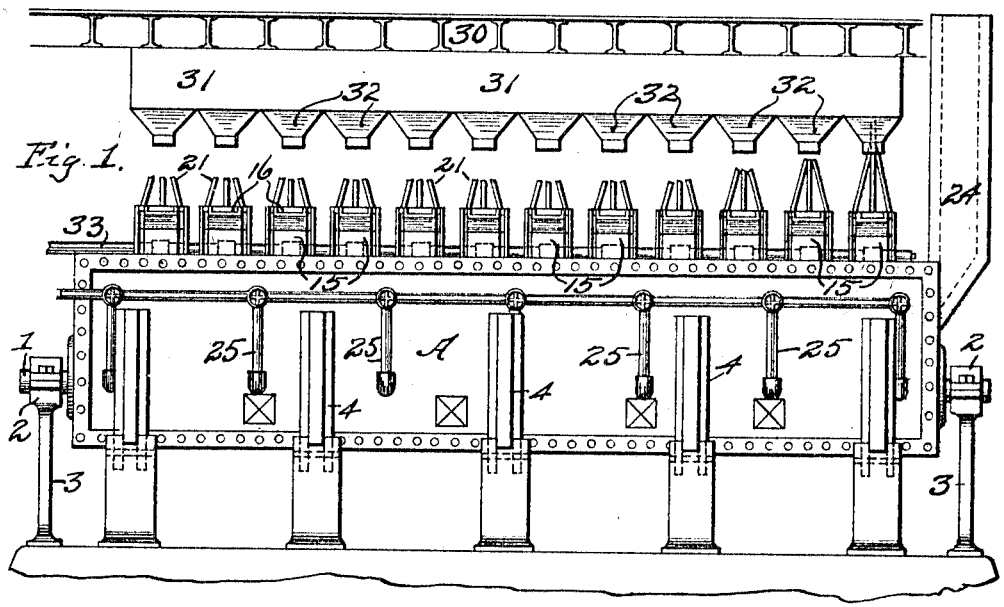
Figure 2:
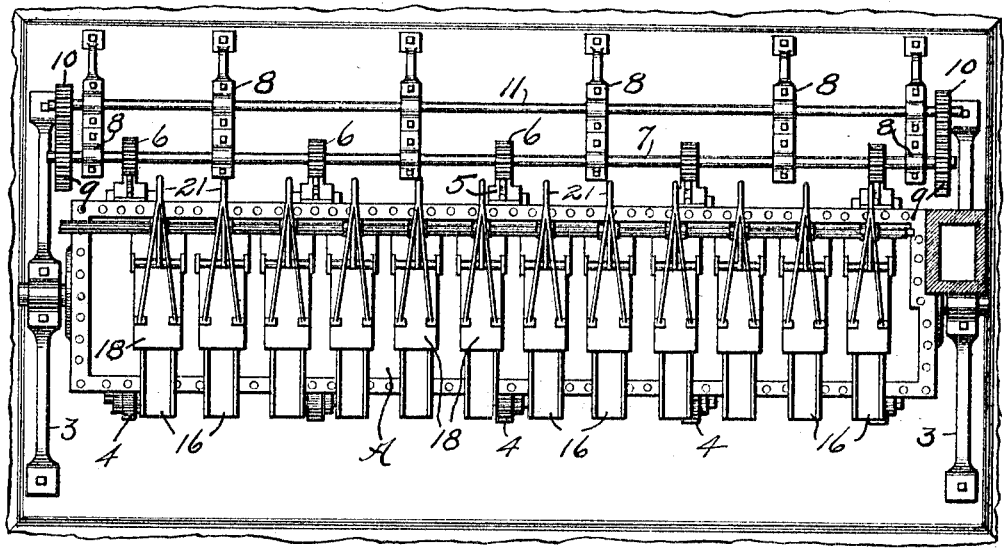
Figure 3:
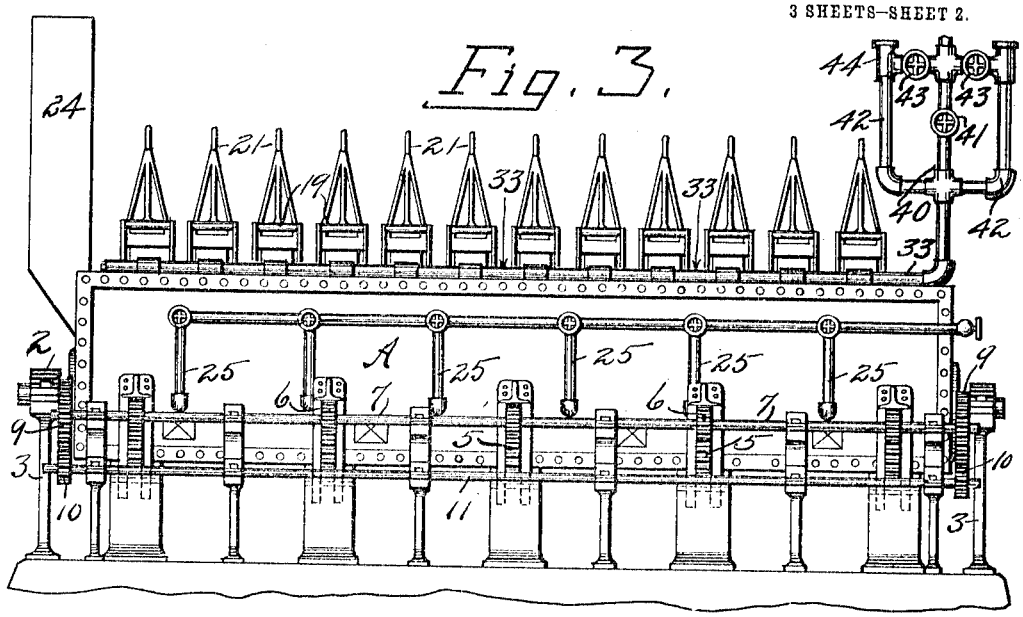
Figure 4:
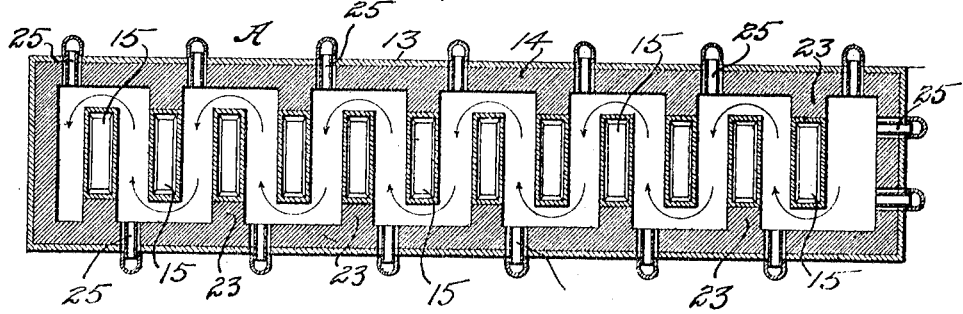

Figure 1 is a side elevation of a smelting furnace constructed in accordance with the invention, showing the relation between the furnace and the charging bins. Fig. 2 is a top plan view of the furnace. Fig. 3 is a side elevation of the furnace, showing the opposite side of the furnace to that which is shown by Fig. 1. Fig. 4 is a horizontal sectional view through the furnace at the bottom thereof. Fig. 5 is an end view of the furnace, the furnace being shown in an upright position ready to be turned to a tilted position. Fig. 6 is a longitudinal sectional view through a portion of the furnace body, and Fig. 7 is a transverse sectional view through the furnace body.

Corresponding and like parts are referred to in the following description and indicated in all the views of the drawings by the same reference characters.

The furnace body A is preferably of an elongated formation and mounted so as to have a tilting action. For this purpose the ends of the furnace body are provided with the trunnions 1 which are journaled within suitable bearings 2 at the upper ends of standards 3. The exterior of the furnace body is provided at the bottom and sides thereof with transverse webs 4 which carry the segmental racks 5, the said racks engaging pinions 6 upon a longitudinal shaft 7 which is arranged at one side of the furnace and is journaled within suitable bearings in a second set of standards 8. The two extremities of the longitudinal shaft 7 are provided with gear wheels 9 which mesh with pinions 10 on a counter-shaft 11 which is also journaled within suitable bearings upon the second set of standards 8. Any suitable means such as a handle 12 (Fig. 5) may be employed for rotating the counter-shaft 11 and turning the shaft 7 to tilt the furnace body.

The furnace body is shown as formed of an outer metallic shell 13 and a lining 14 of fire brick or other refractory material. The top of the furnace body A is provided with a longitudinal series of openings through which the crucibles 15 are lowered into the furnace, the bottoms of the crucibles being flat and resting squarely upon the flat bottom of the furnace, while the upper ends of the crucibles project above the top of the furnace. The upper projecting end of each of the crucibles is provided with a pouring spout 16 at one side thereof, and also with suitable means such as the ears 17 (Fig. 5) by means of which the crucible can be engaged by a derrick or the like when it is desired to remove the same from the furnace. A cover 18 is provided for each of the crucibles 15, the said covers being hinged at 19 upon arms or brackets 20 which project from the top of the furnace and are permanently connected to the furnace. A handle 21 is provided for manipulating each of the covers 18, the said handle being connected to the cover by a suitable tie member or brace 22.

Referring to Fig. 4, it will be observed that one end of each of the crucibles 15 is engaged by an abutment or baffle wall 23, alternate abutments or baffle walls projecting from opposite sides of the furnace so that they have a staggered relation to each other. With this construction, it will be obvious that as the products of combustion travel from one end of the furnace to the chimney or stack 24 at the opposite end of the furnace, they will be compelled to take a circuitous path and will be brought into contact with two sides and one end of each of the crucibles. This circuitous path which is taken by the products of combustion is clearly indicated by the arrows upon Fig. 4. For the purpose of heating the furnace, a series of oil burners 25 are provided, the said oil burners entering the furnace at intervals along the sides thereof and being supplied with oil by the supply pipes 26 upon the exterior of the furnace. A suitable valve 27 is shown as provided for each of the burners 25, and the said burners are so arranged with relation to the crucibles and baffle walls 23 that they tend to assist the movement of the products of combustion around the circuitous path provided for them as they travel toward the stack 24. In furnaces of this character it is important that the heat be kept at the bottom of the furnace as much as possible, and one of the objects of the present invention has been to make provision for this necessity. Within the interior of the furnace the space between adjacent crucibles 15 is absolutely open and unobstructed, the passage around one end of each crucible being closed by the baffle wall 23, while the passage around the opposite end of the crucible is contracted toward the upper end thereof as indicated at 28 and flared or enlarged at the bottom thereof as indicated at 29. It will thus be obvious that as the products of combustion pass from the adjacent spaces between the crucibles they must travel around one end of the intervening crucible, and since this passage is restricted or contracted at 28 toward the upper end thereof, the tendency of the products of combustion will be to flow downwardly toward the bottom of the furnace and through the enlarged portion 29 of the end passage. In this manner the products of combustion are deflected downwardly toward the bottom of the furnace as they pass around the end of each of the crucibles, and the heat is thus retained at the bottom of the furnace where it can act upon the crucibles in the most effective manner. A charging floor 30 is located above the furnace and the ore dust is adapted to be dropped from this charging floor into the bins 31. These bins are provided with a hopper 32 for each of the crucibles 15 so that the ore dust can be charged directly into the crucibles without any intermediate handling of the same. This enables the crucibles to be quickly filled without loss of time, and by tilting the entire furnace, as previously described, the crucibles may also be quickly discharged. An air pipe 33 which extends along the top of the furnace at one side of the crucibles is provided with a series of branches 34 which are detachably connected to the nipples 35 of the crucibles. These nipples 35 are also detachably connected to air pipes 36 which extend downwardly through the ore to the bottom of the crucibles. It will also be observed that each of the covers 18 is provided with a nipple 37, the said nipples being connected to pipes 38 which may lead to a suitable condenser or water bath.

When the furnace is in operation air is supplied to the air pipe 33, preferably under a very low pressure, and this air passes through the individual air feed pipes 36 to the bottom of the respective crucibles. As this air rises through the heated ore it combines with the sulfur, phosphorus, and other impurities so as to carry the same off in the form of fumes. These fumes are led away from the crucibles through the pipes 38 to the condensers or water baths. The ore within the crucibles is subjected to a gentle roasting action and is gradually heated until the fusing point is reached. There is a continuous flow of air upwardly through the ore dust as it is heated, and this air carries away the sulfur, phosphorus, and other impurities in the form of fumes. As soon as the fusing point is reached, the furnace is tilted and the crucibles discharged, since the ore has then been purified and is in condition for subsequent treatment. In the case of iron ores the product of the furnace is ready for immediate conversion into the commercial grades of iron and steel. This furnace can be used successfully in connection with ores containing such a large percentage of sulfur and other impurities that it would be difficult, if not impractical, to treat them in the ordinary blast furnace. The downcomer dust from blast furnaces may also be recovered and treated by the present furnace so as to effectively remove the sulfur therefrom.

A feature of practical importance that may be utilized in connection with the air supplying pipe 33 is best shown in Fig. 3 of the drawings, and consists in connecting with the said pipe 33 an air supplying trunk pipe 40 provided with a main cut-off or throttle valve 41 and having in communication therewith a pair of oppositely arranged by-pass pipes 42, each of which is provided with a cut-off valve 43 and the feed opening 44. When the valves 43 are closed, both pipes 42 are thrown out of action, so that with the valve 41 open the main air supply, through pipes 40, 33, and 34 is undisturbed. However, in the event of it being necessary to introduce pulverized lime, charcoal, or equivalent material into the crucible for the purpose of assisting in driving off the sulfur, phosporous, or other impurities, the valve 41 is closed and either or both of the valves 43 opened up so that the lime or equivalent material can be introduced through the feed opening 44 and carried by the blast of air into the crucibles.

Having thus described the invention, what I claim as new and desire to secure by Letters Patent, is:—

1. An ore treating furnace including a furnace body having a series of alined openings in the top thereof, and also provided with interior vertically disposed baffle walls projecting alternately from opposite inner sides, crucibles removably fitted in said openings and resting upon the floor of the furnace body, said crucibles also arranged to have one side flushly engage one of the baffle walls and the other side spaced from the inner wall of the furnace to produce a circuitous channel through the furnace.

2. An ore treating furnace including a furnace body having a series of alined openings in the top thereof, and also provided with interior vertically disposed baffle walls projecting alternately from opposite inner sides, crucibles removably fitted in said openings and resting upon the floor of the furnace body, said crucibles also arranged to have one side flushly engage one of the baffle walls and the opposite side spaced from the inner wall of the furnace to produce a circuitous channel therethrough, and burners located upon opposite sides of the furnace and at one end, each of said side burners arranged adjacent a baffle wall and disposed upon the side thereof nearest the end burners.

3. An ore treating furnace including a furnace body having a series of alined openings in the top thereof, and also provided with baffle walls projecting alternately from opposite inner sides, crucibles removably fitted in said openings and resting upon the floor of the furnace body, said crucibles also arranged to have one side flushly engage one of the baffle walls to produce a circuitous channel through the furnace, alternately disposed burners located upon the opposite sides of the furnace and arranged to discharge in opposite directions upon opposite sides of said crucibles, and other burners located at one end of the furnace and discharging longitudinally into the interior thereof.

4. An ore treating furnace including a furnace body provided with a series of alined openings in the top thereof, crucibles fitted within the alined openings and resting on the bottom of the furnace, each of the crucibles being provided with a nipple, means for directing heat against the exterior of the crucibles, an air supply pipe connected to the nipples of the crucibles, an individual air pipe connected to the nipple of each crucible and extending downwardly toward the bottom thereof, a cover for each of the crucibles, and means connected with each crucible for carrying the fumes therefrom.

5. An ore treating furnace including a furnace body having a series of top openings, removable crucibles fitted within said openings, means for heating the interior of the body, and an air circulating system including pipes extending into the crucibles, a valved air supplying trunk pipe in communication with said air pipes, and valved by-pass pipes in communication with the trunk pipe and each having a cut-off valve and a feed opening for introducing material therein.

In testimony whereof I hereunto affix my signature in the presence of two witnesses.

GEORGE P. GIBSON.

Witnesses:
 HARRY B. ROOK,
 MARY K. KOOGLE.

Copies of this patent may be obtained for five cents each, by addressing the "Commissioner of Patents, Washington, D. C."